United States Patent [19]

Stewart

[11] 4,065,786
[45] Dec. 27, 1977

[54] VIDEODISC PLAYBACK SYSTEM

[75] Inventor: Wilber Clarence Stewart, Hightstown, N.J.

[73] Assignee: RCA Corporation, New York, N.Y.

[21] Appl. No.: 618,228

[22] Filed: Sept. 30, 1975

[51] Int. Cl.$^2$ .............................................. H04N 5/76
[52] U.S. Cl. ............................ 358/128; 179/100.3 V; 179/100.3 G; 250/570; 358/127
[58] Field of Search .......... 178/6.6 R, 6.6 DD, 6.7 A; 179/100.3 V, 100.3 G, 100.3 B, 100.41 L, 100.4 A; 250/570, 578, 550; 358/128, 127, 130, 132

[56] References Cited

U.S. PATENT DOCUMENTS

| | | | |
|---|---|---|---|
| 3,567,855 | 3/1971 | Hamisch | 179/100.3 Z |
| 3,829,622 | 8/1974 | Elliot | 179/100.3 V |
| 3,860,766 | 1/1975 | Mori | 179/100.41 L |
| 3,909,608 | 9/1975 | LeMerer | 179/100.3 G |
| 3,911,211 | 10/1975 | Rennick | 178/6.6 R |
| 3,913,076 | 10/1975 | Lehureau | 179/100.3 G |
| 3,919,562 | 11/1975 | Whitman | 179/100.3 V |
| 3,931,459 | 1/1976 | Korpel | 178/6.6 DD |
| 3,931,460 | 1/1976 | Watson | 178/6.6 DD |
| 3,962,720 | 6/1976 | Braat | 179/100.3 V |

*Primary Examiner*—Bernard Konick
*Assistant Examiner*—Alan Faber
*Attorney, Agent, or Firm*—Eugene M. Whitacre; William H. Meagher; Wendell K. Fredericks

[57] ABSTRACT

Recovery from a record of data recorded in an elongated information track, comprising depressed areas of a given width, a given depth, and a variable length, alternating along the length of the track with relatively non-depressed areas, is effected by an optical playback system. The playback system employs means for focusing light from a laser source on the information track as a light spot having a (half-intensity) width which is less than the given width of the depressed track areas. Light detection means, responsive to light diffracted by the track as relative motion is established between the track and the focused light spot, include: (1) means responding to the overlap of the undeviated zero diffraction order of the diffracted light and the plus first diffraction order thereof, and (2) separate means responding to the overlap of the undeviated zero order and the minus first order. Differential combination of the outputs of the respective overlap responding means provides an output signal representative of the recorded data. Tracking error indications are also derived from the diffracted light. In one embodiment of the playback system, the focused light spot is asymmetrical, having a lateral dimension greater than its longitudinal dimension along the track. Preferred relationships between incident light wavelength and depression depths are disclosed for transmissive and reflective record playback systems.

13 Claims, 3 Drawing Figures

VIDEODISC PLAYBACK SYSTEM

The present invention relates generally to novel playback systems employing optical techniques for playback of high density information records, and particularly to playback systems and optical techniques therefor which may be employed to recover video information from the spiral track of a video disc record.

The playback principles of the present invention are applicable to the recovery of data recorded in an information track formed as a succession of depressed areas of a given width alternating with non-depressed areas along the length of the track. Pursuant to a desirable feature of the invention, an optical system is provided for directing light from a coherent light source upon the information track, with the light focused on the track as a spot having a half-intensity width (i.e., the dimension of the spot in a direction transverse to the length of the track, measured between half-intensity points) which is less than the track width (i.e., less than the given width of the depressed areas of the track). In an illustrative instance where the track is configured as a spiral on the surface of a record of disc form, the use of such a spot width dimension is of considerable aid in avoidance of crosstalk between information recorded in adjacent convolutions of the spiral track. That is, when the light spot is properly centered on a given convolution of the track, the incidence of light on adjoining track convolutions is essentially precluded, and such a condition is moreover maintained over a relatively wide range of spot mis-centering.

The spot width choice of the present invention is in contrast with the spot dimension employed in prior art systems of the type exemplified by the arrangement described in the article entitled, *"The Optical Scanning System of the Philips 'VLP' Record Player"*, by G. Bouwhuis and P. Burgstede, appearing at pages 186–189 of Volume 33 of the Philips Technical Review (1973, No. 7). In the Philips arrangement, a circular light spot focused on the information track of a reflective video disc has a half-power diameter which is greater than the width of the depressed areas of the information track by an amount sufficient to ensure that a significant portion of the incident light falls upon the adjoining "lands" (flat disc surface areas between adjacent track convolutions) when the spot is optimally centered upon a desired track convolution. Unless a tight limit is held on spot mis-centering, crosstalk from adjoining track convolutions can be encountered to an annoying degree.

In the aforesaid Philips arrangement, a photosensitive element is centered in the path of light reflected by the track and adjoining land areas. By choosing a pit depth for each depressed area of the information track which corresponds to a quarter wavelength at the frequency of the incident light, an optical path difference of a half wavelength is established between: (a) light reflected from the depressed track areas, and (b) light reflected from the non-depressed track areas and the land areas. With such an optical path difference established, one obtains destructive interference between the land-reflected light and the pit-reflected light on the one hand and constructive interference between the land-reflected light and the light reflected from the non-depressed track areas on the other hand. The alternations between a predominance of destructive interference and a predominance of constructive interference, as depressed areas of the track pass the focused spot location, are reflected in variations of the electrical output of the photosensitive element.

By virtue of the continuous presence of light from a reference surface (i.e., the land-reflected light) throughout the passage of the successive track regions, the Philips arrangement provides an interferometric form of readout of the information track which enables resolution of a signal element (e.g., pit) of a longitudinal dimension (i.e., along the length of the track) shorter than the longitudinal dimension of the focused light spot (with the resolution limit occurring at one-half the longitudinal dimension of the focused spot).

In using the spot width choice of the present invention, one foregoes the aforesaid continuous presence of light from a reference surface. As a consequence, if one employs a single, centered photosensitive element, as in the Philips arrangement, to sense the effect of the passing track areas with respect to a focused light spot dimensioned pursuant to the present invention, the resolution of a signal element of a longitudinal dimension shorter than the longitudinal dimension of the focused light spot is not feasible (the resolution limit occurring in this instance at a length corresponding to the longitudinal dimension of the focused spot).

However, by departing from the aforesaid centered light detector approach, pursuant to a further feature of a preferred form of the present invention, one may retain the crosstalk freedom aspects of the present invention while obtaining a resolution capability comparable to that achieved with the above-described interferometric readout method. In accordance with this further feature of the invention, the use of a single, centered light detector is supplanted by the use of at least one off-centered light detector shifted from the axis of the light path (of light diffracted by the pit pattern of the information track) in a direction enabling the detector to respond to an overlap of light in an undeviated zero diffraction order image with light in one of the deviated (+ and −) first diffraction order images, to the relative exclusion of response to the overlap of light in said zero diffraction order image with light in the other of the deviated first diffraction order images. With such an off-centered detector approach, a 2 to 1 improvement in resolution capability is obtained relative to centered detector use (resulting in a resolution limit corresponding to half the longitudinal dimension of the focused light spot). It is advantageous to supplement the above-mentioned off-centered light detector with a second light detector, which is oppositely off-centered so as to respond to the second-named overlap to the relative exclusion of the first-named overlap. By combining the outputs of the respective, oppositely off-centered light detectors, a doubling in amplitude of the recovered information signal, with an attendant improvement in signal-to-noise ratio, is realizable (relative to single, off-centered detector use).

For successful use of the aforesaid diffraction order overlap sensing approach, it is necessary that the optical path difference (i.e., difference between the optical path length for the light reaching the detector after impingement upon a depressed track area, and the optical path length for light reaching the detector after impingement upon a non-depressed track area) be other than the half wavelength difference noted above for the Philips arrangement. It has been determined that, in use of the overlap sensing approach, maximum detection sensitivity is attained when the aforesaid optical path difference corresponds to an odd integral multiple of a quarter wavelength at the frequency of the incident light (e.g., ¼ wavelength; ¾ wavelength; etc.), while minimum response is associated with an optical path difference corresponding to an even integral multiple of a quarter wavelength (e.g., ½ wavelength; 1 wavelength; 1½ wavelengths; etc.).

In application of the principles of the present invention to a reflective disc system, an information track having a relatively shallow pit depth corresponding to ⅛ of a wavelength, at the frequency of the light employed for playback, will thus be subject to efficient readout using the off-centered detector approach. A prior art example of off-centered detector use for recorded signal recovery is presented in an article entitled, "An Experimental Optical Videodisc Playback System", by G. W. Hrbek, appearing in the July, 1974, issue of the Journal of the SMPTE. The Hrbek playback system is of a transmission form responding to light passing through the information track of a transparent disc formed of a material (polyvinyl chloride) having an index of refraction of 1.54; for such playback circumstances, a pit depth of approximately a half wavelength is required to obtain an optical path difference corresponding to a quarter wavelength.

In the system described by Hrbek, the spot width choice of the present invention is not employed; rather, the width dimension of the spot focused on the information track exceeds the width of the depressed track areas, whereby light impinging upon "land" areas contributes significantly to the light illuminating the off-centered light detector, without aiding the recovery of the recorded information by the off-centered light detector, and to the possible detriment of the associated signal-to-noise ratio.

Use of a playback system embodying the principles of the present invention also facilitates convenient identification of tracking errors. With record pit depth related to incident light frequency in such a manner that the aforementioned optical path difference is other than an even integral multiple of a quarter wavelength at the incident light frequency, one may readily employ a split detector approach for tracking error detection, such as is suggested in the above-discussed Hrbek article. The complexity of providing auxiliary light beams for tracking error determination, as required in the system of the Philips article, may be conveniently avoided.

While a circular configuration may be employed for the light spot focused on the record's information track in practice of the present invention, it has been found that improvements in signal-to-noise ratio may be realized (particularly where the width of the pits of the information track subject to playback is large relative to the longitudinal pit dimensions) by departing from the circular configuration to obtain a spot contour (e.g., elliptical) having a lateral dimension (transverse to the track) which is greater than its longitudinal dimension.

In an illustrative application of the principles of the present invention, a system is provided for optical playback of spirally grooved video disc records of the RCA type described generally in the article entitled, "Television on a Silver Platter", by D. Mennie in the August, 1975, issue of IEEE Spectrum (pages 34-39). In such records, the recorded information track appears as a succession of slots formed as depressions extending across the curved bottom of the groove and alternating with relatively non-depressed regions of the curved bottom. Illustratively, for a 30-minute record intended for playback at 450 rpm, the slots have lengths (i.e., along-the-track dimension) varying in a range between 0.25 micrometer and 0.9 micrometer, while the slot widths (i.e., slot dimensions transverse to the track) are substantially constant at about 3 micrometers, and the slot depth is approximately 0.08 micrometer.

Through use of off-centered detectors for signal recovery, response to slots as short as 0.25 micrometer is realizable, for example, in such a playback system employing light from a blue HeCd laser (wavelength of 0.442 micrometer), with a focusing lens providing at the disc surface, a light spot having a half-intensity longitudinal dimension of approximately 0.33 micrometer. Illustratively, a cylindrical lens system preceding the focusing lens establishes an elliptical contour for the focused light spot so that the half-intensity lateral dimension thereof is approximately 2 micrometers.

Objects, features and advantages of the present invention will be recognized by those skilled in the art upon a reading of the following detailed description and an inspection of the accompanying drawings wherein.

Figure 1:
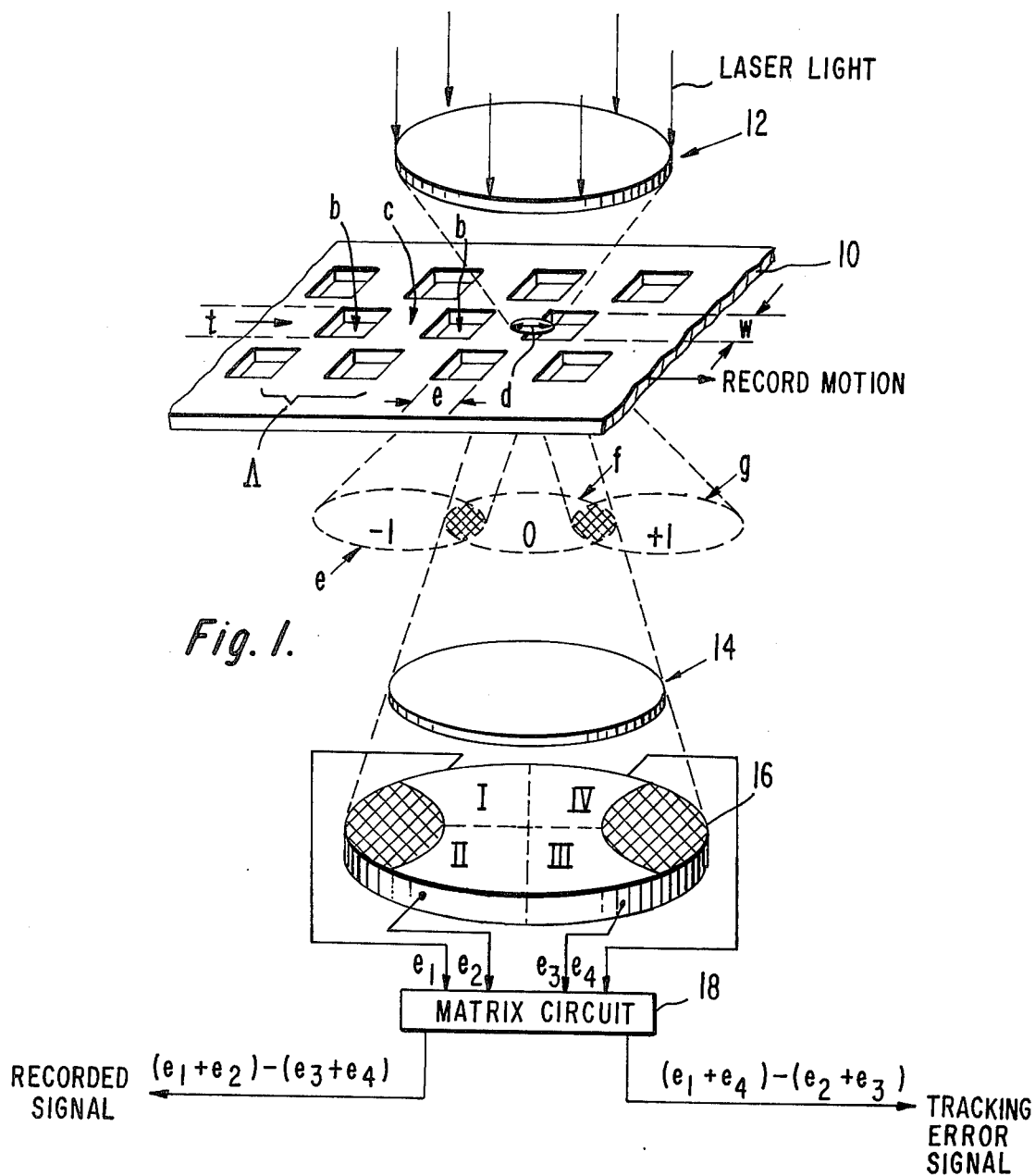
FIG. 1 illustrates a portion of an optical playback system embodying the principles of the present invention.

With reference to FIG. 1, data is recorded on an information track "t" of a record 10 (of light transmissive material) as a succession of depressed areas "b" of a given width "w" alternating with non-depressed areas "c" along the length of the information track. Illustratively, the track "t" is disposed in a spiral configuration on the surface of the record 10, whereby the depressed and non-depressed areas of a given region of the track are laterally adjacent to other track regions appearing in adjacent convolutions of the spiral.

A beam of light is focused on track "t" by focusing lens 12 as a circular light spot having a half-intensity diameter "d" which is less than the width "w". As record 10 is moved (in the track's longitudinal direction, as shown in FIG. 1) the focused light impinges upon successive regions of track "t".

The impinging light is diffracted by the track into at least three diverging cones of light. These cones correspond to an undeviated zero diffraction order "f" and to plus and minus deviated first diffraction orders "g" and "e". Higher diffraction orders (n + 1) do occur, but these orders contribute very little information. The shorter the variable spatial period ($\Omega$) of the pit pattern formed by the successive depressed and non-depressed areas (b and c) of the track, the larger is the angle of divergence between the respective light cones. The range of dimensions provided for the spatial period ($\Omega$) in the track of record 10 is restricted in such a manner that the consequent angle of divergence always results in overlaps between the zero order cone and the respective first order cones.

When relative motion at a continuous velocity "v" is established between the information track "t" and the focused light spot, the optical frequency of the diffracted light of the minus first order experiences a doppler shift, being downshifted an amount $\Delta f$, while the optical frequency of the light of the zero order is unshifted, and the optical frequency of the light of the plus first order is upshifted by $\Delta f$, where $\Delta f$ is "v" divided by the period ($\Omega$) of the periodic pit pattern. In the region of overlap between the light cones of the zero order and the minus first order, there are alternating cycles of constructive and destructive interference between the respective light components at the different optical frequencies, as the light spot is diffracted by successive regions of the information track. Complementary cycles of constructive and destructive interference are simultaneously occurring in the other region of overlap (between the light cones of the zero order and the plus first order).

If a single photosensitive element were interposed in a centered position in the path of the diffracted light and arranged to accept the zero order cone, the element would capture light from both regions of overlap, with responses thereto of equal magnitudes but opposite senses resulting in no net signal recovery.

Instead, the embodiment of FIG. 1 provides split detection means which enables separate responses to the respective regions of overlap. Collecting lens 14 directs light from the zero order cone "f" including the overlap regions onto detector 16. Detector 16, containing an independent photosensitive cell in each quadrant, converts light energy of cone "f" into electrical energy. Cells I and II are responsive to that portion of light of cone "f" containing the region of overlap with cone "e", while cells III and IV are responsive to the other portion of light of cone "f" containing the region of overlap with cone "g". With each cell properly biased by means not shown in FIG. 1, individual voltage sources ($e_1$ through $e_4$) exist representative of the light energy received by each cell. Voltages $e_1$ and $e_2$, generated by cells I and II respectively, are summed within matrix 18 to provide a first voltage sum corresponding to that portion of light from cone "f" containing the region of overlap with cone "e", while $e_3$ and $e_4$, from cells III and IV, are similarly summed within matrix 18 to provide a second voltage sum corresponding to that portion of cone "f" light containing the region of overlap with cone "g". The first voltage sum is differentially combined with the second voltage sum by circuits within matrix 18 to produce an output signal reproductive of the recorded data.

By using the above circuit arrangement for obtaining the output signal representation of the recorded data, detector 16 is effectively transformed into a split detector that is electrically divided into two halves; namely, a first half consisting of cells I and II and a second half consisting of cells III and IV; the first half providing electrical responses to light incident from that portion of cone "f" containing regions of overlap with cone "e"; the second half providing electrical responses to light incident from that portion of cone "f" containing regions of overlap with cone "g".

For the purpose of deriving a tracking error signal, matrix 18 additionally includes circuits for providing the differential combination of a third voltage sum ($e_1 + e_4$) and a fourth voltage sum ($e_2 + e_3$). By use of the latter circuit arrangement, detector 16 is effectively transformed into still another split detector being again electrically divided into two halves having cells I and IV responsive to a portion of the light from cone "f" which is different from that portion of cone "f" light that impinges on cells II and III. When the voltage sums from this second split detector configuration are differentially combined, a tracking error signal is provided which is representative of the sense and magnitude of mis-centering when the light spot departs from the center of track "t".

For adequate detection sensitivity in the use of the split detector arrangement in the apparatus of FIG. 1, one must take into account the relationship between: (a) the wavelength of the light employed in forming the focused light spot, and (b) the difference between the optical path lengths provided for: (1) the light reaching the detector 16 after impingement upon a depressed area "b" of the information track, and (2) the light reaching the detector 16 after impingement upon a non-depressed area "c" of the information track. As shown by curve B of FIG. 2, the peak-to-peak signal recoverable by the FIG. 1 detector arrangement varies for different values of such optical path difference (OPD), with peak detection sensitivity realizable when the OPD corresponds to an odd integral multiple of a quarter wavelength at the frequency of the incident light, and with response nulls occurring when the OPD corresponds to an even integral multiple of a quarter wavelength thereof. This in in direct contrast with the relationship between detection sensitivity and optical path difference which is associated with centered detector response to a wider-than-track spot (as used, for example, in the aforesaid Philips arrangement); as shown by curve A in FIG. 2, peak detection sensitivity is realizable in the latter instance when the OPD corresponds to an integral multiple of a half wavelength at the frequency of the incident light.

Figure 2:
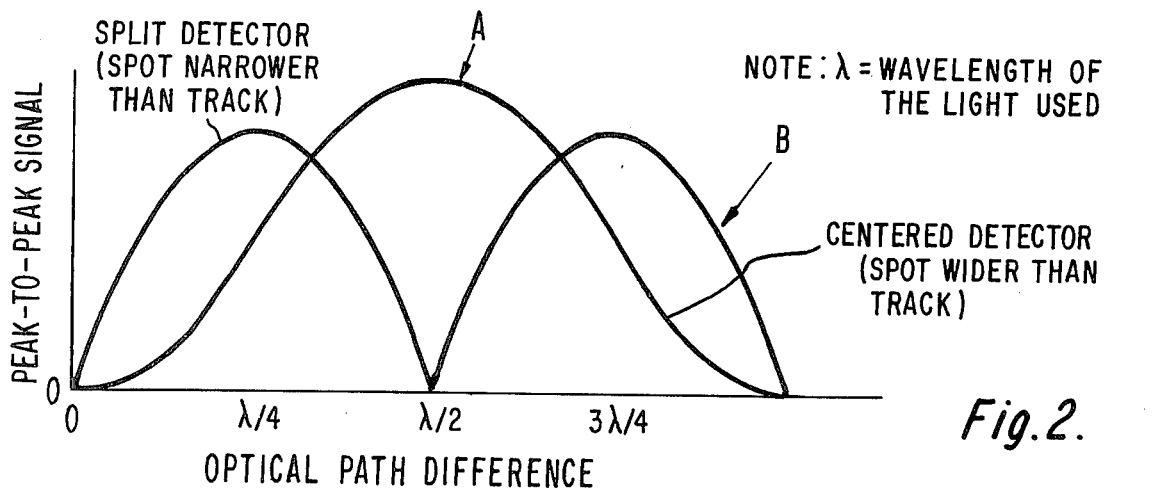
FIG. 2 illustrates graphically the relationship between optical path differences (OPD) and detection sensitivity for several detection systems to aid in explanation of the principles of the present invention.

As curve B of FIG. 2 indicates, one should avoid, in choosing the relationship between the incident light wavelength and the pit depths of record 10 in the FIG. 1 system, establishment of an OPD corresponding to an even integral multiple of a quarter wavelength. For transmissive record systems, of which FIG. 1 is an example, the OPD obtained corresponds to the pit depth multiplied by $(N - 1)$, where N is the index of refraction of the record material. Thus, where the record material's index of refraction falls at a value of 1.5, for example, one should avoid choice of an incident light wavelength which coincides with the pit depth dimension of the transmissive record (e.g., choosing instead a longer incident light wavelength, such as one approaching or equaling twice the pit depth dimension). For reflective record systems, to which the principles of the present invention are also applicable (as specifically considered in the subsequent discussion of FIG. 3) the OPD obtained corresponds to twice the pit depth. Thus, in the instance of split detector use with a reflective record, one should avoid choice of an incident light wavelength which coincides with four times the pit depth dimension of the reflective record (e.g., choosing instead a longer incident light wavelength, such as one approaching or equaling eight times the pit depth dimension).

Figure 3:
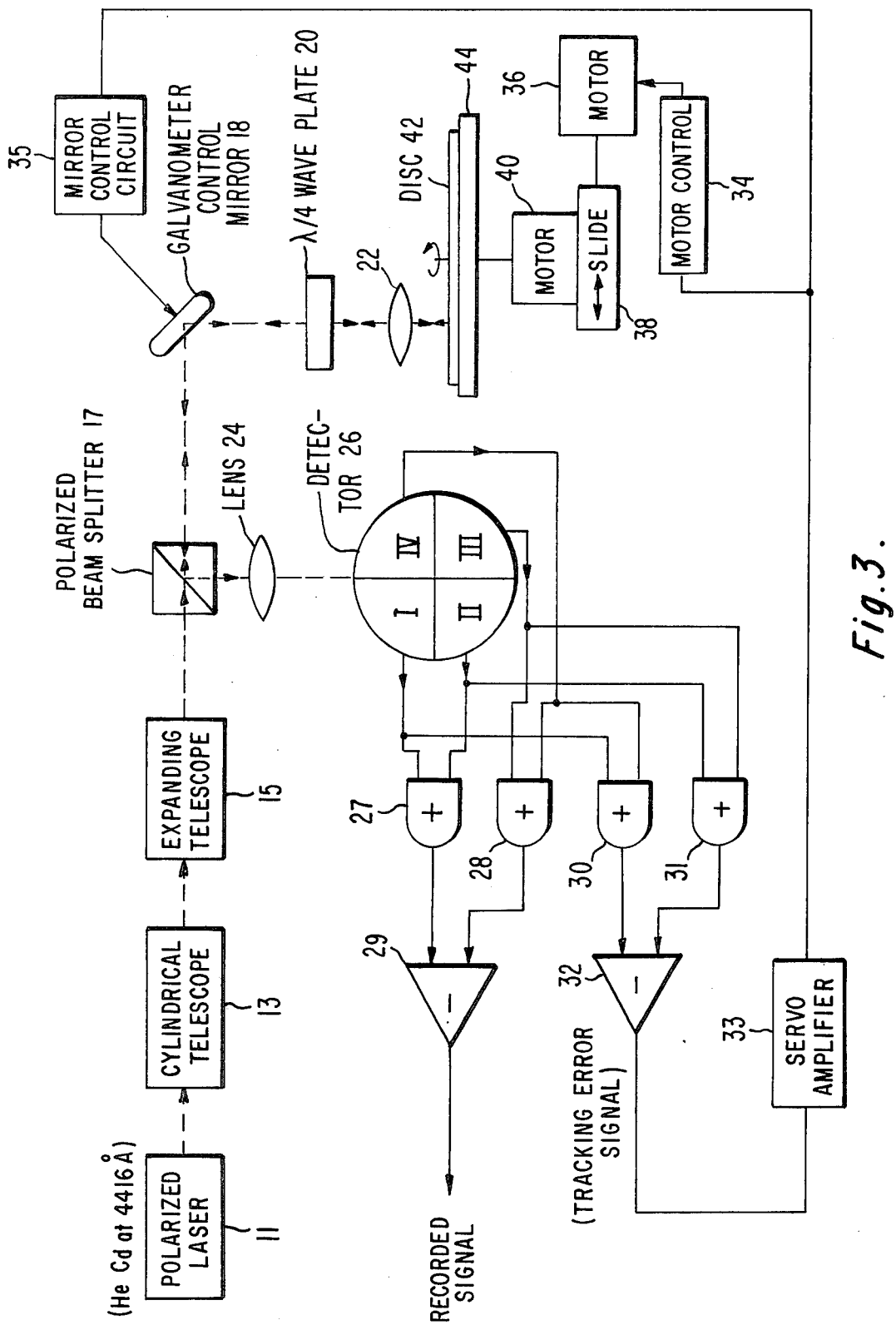
FIG. 3 is a block diagram of an optical video playback system in accordance with a further embodiment of the present invention.

For an illustration of application of the principles of the present invention to playback of a light-reflective record, reference is now made to FIG. 3, which shows a system for playback of an information track appearing in a spiral configuration on a surface of a disc record 42. During playback, the disc 42 is supported on a turntable 44 in a position permitting the impingement upon the disc's information track of a light beam focused thereon by a lens 22. Rotation of the turntable 44 by a motor 40 moves successive regions of the information track through the focused light beam location. In order that the focused light beam may track the successive convolutions of the spiral information track, a radial drive is provided for the turntable assembly. Illustratively, the desired radial drive is established by the mounting of the motor-driven turntable assembly upon a slide 38, which is driven in a radial direction by a motor 36 at a controlled rate appropriately related to the rate of rotation of disc 42.

A source of light in the playback system of FIG. 3 is provided by a laser 11. Illustratively, the laser 11 is of the helium-cadmium type, emitting a beam of coherent light of generally circular contour at a wavelength of approximately 0.442 micrometer. For purposes to be subsequently described, the output of laser 11 is subject to linear polarization in a selected direction.

The circular light beam emanating from laser 11 enters cylindrical telescope 13 (incorporating an anamorphic lens system) and emerges reshaped as a light beam with a substantially elliptical contour but retaining its linearly polarized direction. The elliptical beam then enters the adjacent expanding telescope 15 and emerges with no change in shape or polarization but as an enlarged elliptical beam. This enlarged elliptical light beam enters the entrance face of polarized beam splitter 17 and is transmitted by the exit face unchanged in polarization or shape. The enlarged elliptical beam impinges upon the galvanometer controlled mirror 18 and is totally reflected toward the track of disc 42. The elliptical beam enters quarter-wave plate 20 wherein the light is changed from a linearly polarized state to a right circularly polarized state. Lens 22, interposed between quarter-wave plate 20 and disc 42, receives the elliptical light beam and focuses the beam to form an elliptical light spot on the track of disc 42, with the major axis of the elliptical light spot lying transverse to the track, and with the half-intensity dimension of the spot along said major axis being less than the track width. Suitable means (not shown) may be associated with lens 22 to ensure maintenance of proper spot focus on the information track; illustratively, such means may incorporate an appropriate air bearing between lens 22 and disc 42.

The focused light beam is diffracted by the recorded data, appearing in the spiral track as a succession of depressed areas alternating along the length of the track with non-depressed areas, into at least three primary diffraction order cones of light, as discussed in connection with FIG. 1; namely, the zero and the plus and minus first order cones, here having elliptical cross-sectional contours. The zero order cone is reflected from the track undeviated with respect to the incident light while the first order cones are reflected from the track at angles which deviate such that the two first order cones overlap the undeviated zero order cone in opposite regions of the latter. The reflected light, which is left circularly polarized, is collected by lens 22. The collected light enters quarter-wave plate 20 wherein it is changed from a circularly polarized state to a linearly polarized state.

The linearly polarized reflected light impinges onto the galvanometer controlled mirror 18 and is reflected thereby toward the polarized beam splitter 17. The reflected light arrives at the beam splitter 17 with a direction of polarization which is shifted 90° relative to the direction of polarization of the light from laser 11 transmitted by beam splitter 17, and is reflected by beam splitter 17 in a direction orthogonal to the incident light path. This orthogonally reflected light is focused by lens 24 onto a light-accepting region of a light detector 26.

Detector 26, illustratively containing four independent photosensitive cells (I-IV) disposed symmetrically about the center of the light accepting region, converts the accepted light energy to electrical energy. Cells I and II are responsive to a portion of the zero order light cone containing a region of overlap with one of the plus and minus first order light cones, while cells III and IV are responsive to another portion of the zero order light cone containing a region of overlap with the other of the plus and minus first order light cones. With appropriate biasing of the cells by means not shown, individual voltage sources exist representative of the light energy received by each cell. Voltages generated by cells I and II are summed by adder 27 to provide a first voltage sum while voltages generated by cells III and IV are summed by adder 28 to provide a second voltage sum. The first voltage sum is differentially combined with the second voltage sum in differential amplifier 29 to produce an output signal reproductive of the recorded data.

Similarly, voltages generated by cells I and IV are summed by adder 30 to provide a third voltage sum while voltages generated by cells II and III are likewise summed by adder 31 to provide a fourth voltage sum. The third voltage sum is differentially combined with the fourth voltage sum in differential amplifier 32 to produce a tracking error signal representative of the sense and magnitude of miscentering when the light spot departs from the center of the track. The adders (27, 28, 30, 31) and differential amplifiers (29, 32) are representative of the kinds of circuits contained in matrix circuit 18 of FIG. 1.

The tracking error signal is routed to servo amplifier 33 which produces a control voltage which is illustratively used by two components of the playback system. The control voltage is routed to motor control circuit 34 to provide control of motor 36 for coarse adjustments of the disc's track alignment with the focused spot, and to mirror control circuit 35 to provide control of the pivoting of mirror 18 for precision adjustments of the lateral centering of the incident light beam with respect to the track.

The playback system of FIG. 3 is suitable for use, for example, in optical playback of spirally grooved video disc records of the aforementioned RCA type, where the information track appears as a succession of slots, formed as depressions extending across the curved bottom of the groove, and alternating with relatively non-depressed regions of the curved bottom. For representative track dimensions (e.g., track width — 3 micrometers; slot depth — 0.08 micrometer; and slot dimension along the track varying between 0.25 micrometer and 0.9 micrometer), the formation of the blue light beam (0.442 micrometer wavelength) from laser 11 into a focused elliptical light spot having a major axis dimension of about 2 micrometers and a minor axis dimension of 0.33 micrometer provides satisfactory recovery of the recorded signals by the described detector system. The expansion of the focused light beam's lateral dimension (by cylindrical telescope 13) permits beam access to a greater amount of signal information and the effective averaging out of track imperfections (with resultant improvement in signal-to-noise ratio), without sacrificing achievement of the along-the-track spot dimension required for proper resolution. Moreover, the groove bottom curvature presence in this instance aids the illustrated tracking servo systems in closely maintaining the desired spot centering. Illustratively, a four-element light detector of the PIN SPOT/4D type marketed by United Detector Technology, Inc. may be used for detector 26 in FIG. 3. Reference may be made to the copending application, Ser. No. 618,246, of Arthur H. Firester, entitled, OPTICAL PLAYBACK SYSTEM, and concurrently filed herewith, and published on Dec. 7, 1976 as Defensive Publication No. T953,002, for a description of a preferred arrangement for a four-element detector in performing the function of detector 26 in the FIG. 3 system.

It should be recognized that in realizable systems, a uniform intensity cross-section for the light beam focused on the information track is not practically attainable. Rather, the intensity distribution will be non-uniform, and may typically result in a focused light spot having a central bright region (of peak intensity at its center) ringed by a succession of dark and dimly lighted regions. For practical identification of spot dimensions herein, reference has been made to the distance (in the direction under consideration) between half-intensity contour points in the beam cross-section (the beam intensity at the half-intensity contour points corresponding to half the peak intensity for beam's intensity distribution). It should thus be understood that recitations of spot dimensions in the specification, and in the claims appended hereto (e.g., spot "width", the spot's "longitudinal dimension", etc.) refer, as aforesaid, to distance between half-intensity contour points in the direction under consideration.

What is claimed is:

1. An optical playback system for recovering from a record data recorded in an elongated information track on said record, said information track comprising a succession of depressed areas of a given width of a given depth, and of variable lengths, alternating along the length of said information track with relatively non-depressed areas; said system comprising:
   a. means for focusing a light spot on said information track, said focused light spot having a first dimension in a direction transverse to the length of said information track which is significantly less than said given width;
   b. means for establishing relative motion between the information track and said focused light spot; and
   c. light detection means, responsive to the diffraction of said focused light by said information track during the occurrence of said relative motion, for developing electrical signals representative of said recorded data; wherein said light detection means includes means for responding to the overlap of an undeviated zero diffraction order of said diffracted light with one of the plus and minus deviated first diffraction orders thereof to the relative exclusion of the overlap of said zero diffraction order with the other of the plus and minus deviated first diffraction orders.

2. Apparatus in accordance with claim 1 also including means responsive to said diffracted light for opposing the departure of said light spot from said elongated information track.

3. Apparatus in accordance with claim 1 wherein said light detection means also includes means for responding to said overlap of said undeviated zero order with said other of said deviated first orders to the relative exclusion of said overlap of said undeviated zero order with said one of said deviated first orders, and means for differentially combining the outputs of the respective overlap responding means.

4. Apparatus in accordance with claim 3 wherein said first-named overlap responding means is a first photosensitive means; and said second-named overlap responding means is a second photosensitive means; said first and second photosensitive means being disposed in the path of light modulated by said information track and occupying respective locations oppositely off-centered relative to the axis of the path of said zero diffraction order of said diffracted light.

5. Apparatus in accordance with claim 3 wherein said focused light spot has a second dimension along said elongated track which is greater than the length of the shortest of said depressed areas of said information track.

6. Apparatus in accordance with claim 5 wherein said first dimension is greater than said second dimension.

7. Apparatus in accordance with claim 1 wherein said focused light spot has a second dimension along said elongated track which is greater than the length of the shortest of said depressed areas of said information track, said apparatus also including means for rendering said light spot asymmetrical in such manner that said first dimension is greater than said second dimension.

8. Apparatus in accordance with claim 1 also including a source of light of a particular wavelength which is long relative to the shortest of said variable lengths, and wherein said focused spot is formed by said focusing means using said light from said light source, wherein the optical path length for light from said source reaching said detection means after impinging upon a depressed surface of said track differs from the optical path length for light from said source reaching said detection means after impinging upon a nondepressed surface of said track by a given distance, and wherein said particular wavelength is more than twice said given distance.

9. Apparatus in accordance with claim 8 wherein said particular wavelength is approximately four times said given distance.

10. An optical playback system for recovering from a spirally grooved disc record data recorded in the groove bottom of said disc record as a succession of depressed groove bottom areas of a given width transverse to said groove, of a given depth, and of varying lengths, alternating along the length of said groove with relatively non-depressed groove bottom areas; said system comprising:
   a. a source of light of a wavelength which is long relative to the shortest of said varying lengths, and which is more than four times greater than said given depth;
   b. means for focusing light from said source on said groove bottom in the form of an asymmetrical light spot having a first dimension in a first direction transverse to the length of said groove which is significantly less than said given width, and a second dimension in a second direction orthogonal to said first direction which is smaller than said first dimension;
   c. means for rotating said disc record to establish relative motion between the groove bottom and said focused light spot; and
   d. light detection means, disposed to receive light reflected from the grooved disc record and responsive to the diffraction of said focused light by said groove bottom areas during the occurrence of said relative motion, for developing electrical signals representative of said recorded data;

said light detection means including (1) means for responding to the overlap of an undeviated zero diffraction order of said diffracted light with one of the plus and minus deviated first diffraction orders thereof to the relative exclusion of the overlap of said zero diffraction order with the other of the plus and minus deviated first diffraction orders; (2) means for responding to said overlap of said undeviated zero order with said other of said deviated first orders to the relative exclusion of said overlap of said undeviated zero order with said one of said undeviated first orders; and (3) means for differentially combining the outputs of the respective overlap responding means.

11. Apparatus in accordance with claim 10 wherein said first-named overlap responding means is a first photosensitive means; and said second-named overlap responding means is a second photosensitive means; and wherein said first and second photosensitive means are disposed in the path of reflected light modulated by said groove bottom areas and occupy respective locations oppositely off-centered relative to the axis of said zero diffraction order in said path of reflected light;

said apparatus also including means responsive to light reflected from the groove bottom of said disc record for maintaining said light spot substantially centered in said groove.

12. An optical playback system for recovering from a record data recorded in an elongated information track on said record, said information track comprising a succession of depressed areas of a given width transverse to said information track, of a given depth, and of variable lengths, alternating along the length of said information track with relatively non-depressed areas, said system comprising:
   a. means for focusing a light spot on said information track, said focused light spot having a first dimension in a direction transverse to said information track which is greater than a second longitudinal dimension thereof; wherein said first transverse dimension of said light spot is significantly less than said given width and said second longitudinal dimension is greater than, but less than twice, the shortest of said variable lengths;
   b. means for establishing relative motion between the information track and said focused light spot; and
   c. light detection means, responsive to the diffraction of said focused light by said information track during the occurrence of said relative motion, for developing electrical signals representative of said recorded data; said light detection means including first and second photosensitive means oriented in respective locations oppositely off-centered relative to the axis of a path for light reflected by said information track, and means for differentially combining the outputs of said first and second photosensitive means.

13. A playback system in accordance with claim 12 also including a source of coherent light having a wavelength which is long relative to the shortest of said variable lengths, and which is more than four times greater than said given depth, and an anamorphic lens responsive to light from said source for forming a light beam of substantially elliptical contour; and wherein the light spot focused on said information track by said focusing means is formed from said light beam of substantially elliptical contour.

* * * * *